(12) United States Patent
Gates et al.

(10) Patent No.: US 8,309,934 B2
(45) Date of Patent: Nov. 13, 2012

(54) HIGH RADIATION ENVIRONMENT TUNNEL MONITORING SYSTEM AND METHOD

(75) Inventors: Tell A. Gates, Falls Church, VA (US); John W. Peel, Frederick, MD (US)

(73) Assignee: Celestech, Inc., Chantilly, VA (US)

( * ) Notice: Subject to any disclaimer, the term of this patent is extended or adjusted under 35 U.S.C. 154(b) by 67 days.

(21) Appl. No.: 12/320,619

(22) Filed: Jan. 30, 2009

(65) Prior Publication Data

US 2011/0174982 A1 Jul. 21, 2011

(51) Int. Cl.
 *G01J 1/42* (2006.01)
(52) U.S. Cl. .......................................... 250/394
(58) Field of Classification Search .................. 250/394, 250/395
 See application file for complete search history.

(56) References Cited

U.S. PATENT DOCUMENTS

| | | | |
|---|---|---|---|
| 4,411,485 A * | 10/1983 | Wiseheart et al. | 439/343 |
| 5,733,319 A * | 3/1998 | Neilson et al. | 607/105 |
| 5,763,735 A | 6/1998 | Stahl | |
| 6,252,923 B1 * | 6/2001 | Iacovino et al. | 376/272 |
| 6,640,111 B1 | 10/2003 | Shapira | |
| 6,906,325 B2 | 6/2005 | Quek | |
| 6,922,455 B2 | 7/2005 | Jurczyk et al. | |
| 6,995,667 B2 * | 2/2006 | He et al. | 340/539.13 |
| 7,019,640 B2 | 3/2006 | Canich et al. | |
| 7,026,948 B1 * | 4/2006 | Rutter et al. | 340/693.5 |
| 7,220,967 B1 | 5/2007 | Shapiro et al. | |
| 2003/0038179 A1 | 2/2003 | Tsikos et al. | |
| 2004/0174259 A1 * | 9/2004 | Peel et al. | 340/539.26 |
| 2005/0107103 A1 | 5/2005 | Melpignano | |
| 2005/0108261 A1 | 5/2005 | Glassy et al. | |
| 2006/0237648 A1 | 10/2006 | Bushberg | |
| 2007/0096037 A1 | 5/2007 | Shapiro et al. | |
| 2007/0105548 A1 | 5/2007 | Mohan et al. | |
| 2007/0196235 A1 | 8/2007 | Shur et al. | |

* cited by examiner

*Primary Examiner* — Kiho Kim
(74) *Attorney, Agent, or Firm* — Dan Fiul

(57) ABSTRACT

In accordance with the principles of the present invention utilizing a first radiation monitoring module, radiation information associated with the first radiation monitoring module within a tunnel is wirelessly transmitted to a second radiation monitoring module. The second radiation monitoring module is able to receive radiation information from the first radiation monitoring module for relay of the received radiation information to a central monitoring system. The radiation monitoring modules of the present invention allow long term monitoring of a tunnel's radiation levels with maintenance simply requiring replacement of a non-operational tunnel monitoring module by a robot.

32 Claims, 4 Drawing Sheets

HIGH RADIATION ENVIRONMENT TUNNEL MONITORING SYSTEM AND METHOD

This application claims priority from U.S. application Ser. No. 11/385,648, entitled "HIGH RADIATION ENVIRONMENT TUNNEL MONITORING SYSTEM," filed on Mar. 22, 2006, now U.S. Pat. No. 7,485,871 the entirety of which is expressly incorporated herein by reference.

This application claims the benefit of priority under 35 U.S.C. §119(e) of U.S. Provisional Application No. 60/663,744, filed Mar. 22, 2005, which is herewith incorporated by reference.

BACKGROUND OF THE INVENTION

1. Field of the Invention

The present invention relates to monitoring of high radiation within a radiation waste storage facility. More particularly, it relates to a system and method of monitoring of high radiation within a tunnel waste storage facility using a wireless link and/or a high speed serial interface.

2. Background of Related Art

Conventionally, radiation within tunnels that store radiation waste house sensors that are attached along the walls. The wall attached radiation sensors are interconnected with a hard-wired communication link back to a monitoring station.

A defect within a wall attached radiation sensor requires a technician to don a radiation suite typically lined with lead. The technician must enter the radiation waste storage facility tunnel with the proper tools to either repair a defective sensor and/or replace a defective sensor. Thus, conventional systems to monitor radiation within a radiation waste storage facility tunnel are hazardous and inconvenient to maintain.

Accordingly, there is a need for an efficient system and method for monitoring high radiation within a radiation waste storage facility which eliminates a human having to enter a high radiation tunnel to maintain radiation sensors.

SUMMARY OF THE INVENTION

A radiation detection system in accordance with the principles of the present invention is comprised of a first radiation monitoring module. The first radiation monitoring module is comprising of a radiation detector to detect radiation within a proximate vicinity of the first radiation monitoring module and a wireless transceiver to wireless communicate with a second radiation monitoring module.

A method of monitoring radiation within a tunnel in accordance with the principles of the present invention is comprised of determining a radiation value within a proximate vicinity of a first radiation monitoring module. The first radiation monitoring module establishes a wireless communication link with a second radiation monitoring module. The radiation information is wirelessly transmitted over a communication link between the first radiation monitoring module and the second radiation module.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The Tunnel Monitoring System (TMS) of the present invention provides a unique approach to monitoring radiation levels throughout a radiation waste storage facility. The TMS consists of several elements, a Central Monitoring Subsystem (CMS), communication links from the CMS to the storage tunnels (or DRIFTs), a Translation Modules (TM) located at an entry to each storage tunnel, and Radiation Monitoring Modules (RMM) located throughout the DRIFTs.

Figure 1:
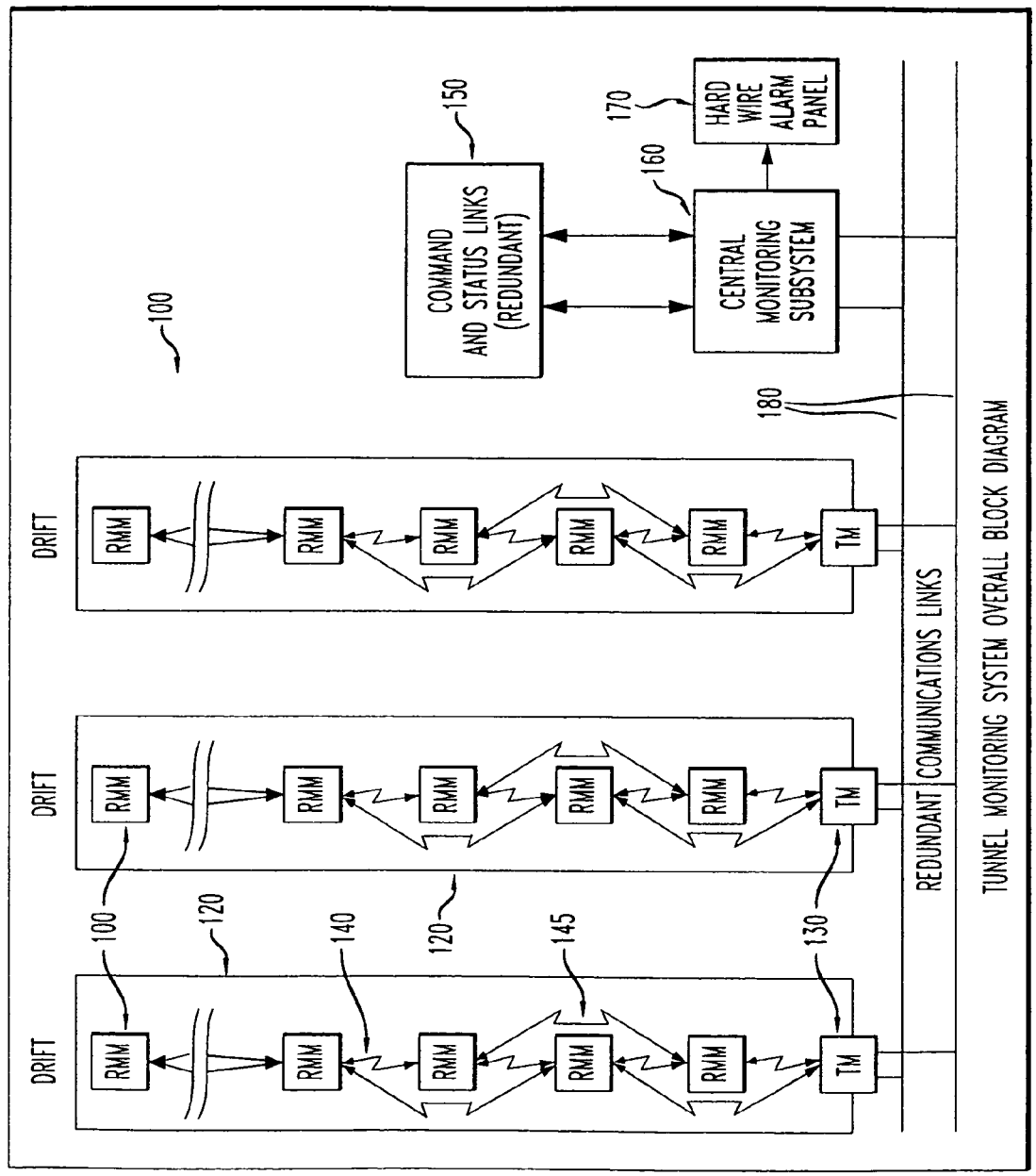
FIG. 1 shows an overall block diagram of the Tunnel Monitoring System (TMS), in accordance with the principles of the present invention.

FIG. 1 shows an overall block diagram of the TMS 100, in accordance with the principles of the present invention. In particular, the TMS 100 shown in FIG. 1 is comprised of RMMs 110, DRIFTs 120, short range wireless communication links 140, long range wireless communication links 145, a local Translation Monitors (TMs) 130, Redundant Communication Links 180, a CMS 160, a Hard Wire Alarm Panel 170 and Command and Status Links (CSL) 150.

Throughout the TMS 100, all elements have block redundancy such that no single point failure can disable the ability of the TMS 100 system to convey information about the DRIFTs 120 being monitored. With the exception of the RMMs 110, all other items of the TMS 100 can be easily repaired and/or replaced using standard commercial practices and equipment. Each of the RMMs 110 is internally redundant, with the capability of bypassing any individual RMM 110 in the event of a complete failure, as will be discussed in detail below.

The CMS 160 provides for overall control of the system. Overall control includes monitoring of all alarm conditions and on-going health and status of TMS 100, as well as system initialization. The CMS 160 will also control self checking of TMS 100 to verify that all functions, including redundancy are operating correctly.

The CMS 160 preferably will utilize commercial high-availability computers and software with fail-over in the unlikely event of a system fault. CMS 160 will provide status and alarm reporting to external nearby and remote monitoring facilities, as well as Hard Wire Alarm Panel 170 to show complete system status at a glance to enable technicians to quickly assess any required action.

Wireless communication links 140 and 145 will use commercial hardware to connect the CMS 160 to the TMs 130 located outside of each tunnel. The separation distance will dictate which commercial hardware format is selected. Communication links 140 and 145 will be redundant such that a single failure cannot disable the entire TMS 100.

Wireless communication links 140 and 145 can be piconets, or small wireless networks, are being formed by more and more devices in many homes and offices. In particular, a popular piconet standard is commonly referred to as a BLUETOOTH® piconet. Piconet technology in general, and BLUETOOTH® technology in particular, provides peer-to-peer communications over short distances, typically limited to approximately 100 feet. Because of the distance limitations associated with conventional BLUETOOTH® communications, RMMs 110 preferably implement a modified BLUETOOTH® transceiver that still relies on the BLUETOOTH® protocol, but extends BLUETOOTH® communications by a factor of ten or more over conventional BLUETOOTH® communications to reduce the number of RMMs 110 needed within a particular DRIFT 120.

The wireless frequency of piconets may be 2.4 GHz as per BLUETOOTH® standards, and/or typically have a 20 to 100 foot range. A piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems and its susceptibility to radiation failure.

A plurality of piconet networks may be interconnected through a scatternet connection, in accordance with BLUETOOTH® protocols. BLUETOOTH® network technology may be utilized to implement a wireless piconet network connection (including scatternet). The BLUETOOTH® standard for wireless piconet networks is well known, described in the BLUETOOTH® specification, version 1.0, publicly available from the web site www.bluetooth.com. The entire BLUETOOTH® specification (core and profiles), version 1.0, is explicitly incorporated herein by reference. Thus, the number of RMMs 110 used within a DRIFT 120 is not limited by the BLUETOOTH® standard.

Moreover, as shown in FIG. 1, the RMM 110 is able to communicate with a neighboring RMM 110 and is able to skip a neighboring RMM 110 for communication with an RMM 110 that is two RMMs 110 away. In this manner, if a next door neighboring RMM 110 becomes inoperable for any reason, each RMM 110 within TMS 100 is still able to pass its own or another RMMs' status/radiation value information to CMS 160.

To conserve power, the RMMs 110 preferably have two operational modes, a high power transmission mode and a low power transmission mode. If everything is working properly, each RMM 110 within the TMS 100 by default operates in a low power transmission mode, communicating over short range wireless communication link 140. If an RMM 110 within TMS 100 is unable to communicate with a next door neighboring RMM 110, the RMM 110 that is unable to establish wireless communications switches to the high power mode. In the high power mode, the RMM 110 that that is unable to establish wireless communications with a next door neighboring RMM 110 is able to bypass the next door neighboring RMM 110 that becomes inoperable and communicate with an RMM 110 that is two RMMs away, communicating over long range wireless communication link 145.

The TMs 130 will use the RMM 110 wireless links in conjunction with a high speed serial interface, e.g., USB, IEEE 1394, Ethernet, etc., to connect to the redundant communication links 180 outside of the DRIFTs 120. Alternately, redundant communication links 180 can be long range wireless communication lines, such as cellular telephone communication links, microwave communication links, wireless wide area network communication links, etc. In this manner, the RMMs 110 modules are linked to lower radiation communications that connect to CMS 160.

Figure 2:
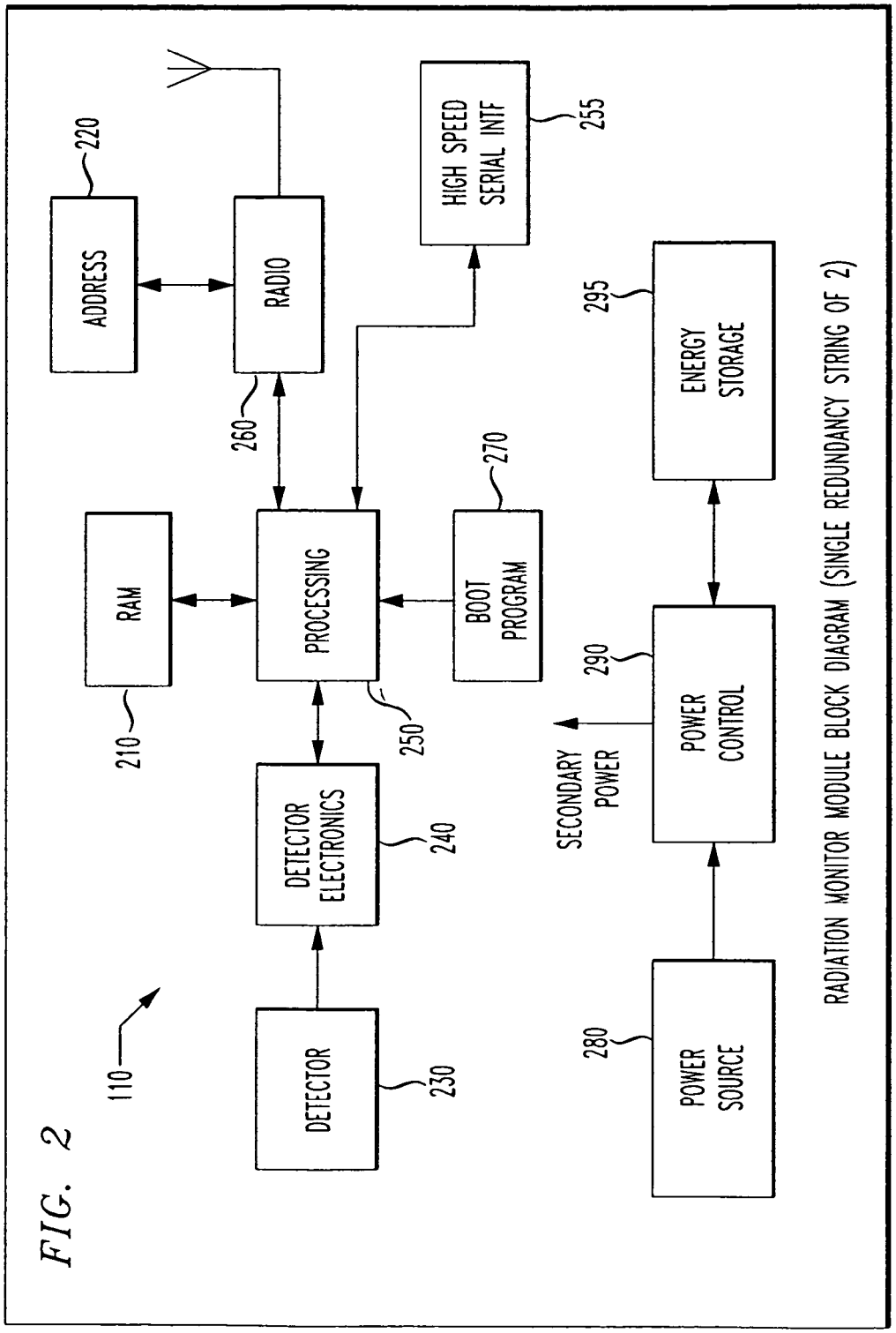
FIG. 2 shows a more detailed view of the Radiation Monitoring Module (RMM) as show in FIG. 1, in accordance with the principles of the present invention.

FIG. 2 shows a more detailed view of the RMM 110 as show in FIG. 1. In particular, the RMM 110 is comprised of a random access memory (RAM) 210, an address unit 220, a radiation detector 230, radiation interface detector electronics 240, a processor 250, a high speed serial interface 255, a radio transmitter 260, a boot program 270, a power source 280, a power control 290, and an energy storage 295. The RMMs 110 comprise the heart of the TMS 100. The RMMs 110 are standalone modules that are internally redundant, with FIG. 2 showing a more detailed view of the redundancy within the RMMs 110.

The RMM 110 consists of one or more radiation detectors 230 interfaced with radiation interface detector electronics 240 to convert the signal from the radiation detectors 230 to a digital signal that is provided to processor 250. The radiation detectors 230 detect radiation levels within a proximate distance from an RMM 110, the proximate distance being variable and dependent upon the actual type of radiation detector employed within RMM 110.

Processor 250 is connected to RAM 210 that contains storage for an operating program and parameter storage. The processor is connected to radio transmitter 260, the radio transmitter connected to address unit 220. Address unit 220 stores a unique hardware address for a particular RMM 110 that is transmitted by radio transmitter to allow CMS 160 to determine which RMM 110 within a particular DRIFT 120 is operating properly and/or detecting a high radiation condition.

The unique address allows CMS 160 to uniquely identify a particular RMM 110 from other RMMs 110. The unique address is associated with status/radiation information from a particular RMM 110, as discussed below, to allow CMS 160 to determine a location of a status and/or problems, i.e., a high radiation issue, a problem with a particular RMM 110 and/or that a particular RMM 110 is operating properly.

The processing section of RMM 110 preferably includes a high speed serial interface 255 for "first in line" communication units in the DRIFT 120 and/or as a debug interface for initial and on-going software development.

The physical enclosure of the RMM 110 is critical to the operation of the TMS 100. Due to the high levels of radiation with a DRIFT 120, the electronics and detectors(s) within the RMM 110 require substantial shielding.

The radiation interface detector electronics 240 include an analog signal amplification and filtering, as well as digitization of the radiation detector. Subsequent signal averaging, etc. are performed in software within RMM 110.

The radiation interface detector electronics 240, processing and RF functions preferably consume less than 50 mW. The RMM 110 will preferably power strobe once per second to minimize power consumption to less than a 50 mW average. Although power strobing at lower or higher frequencies are within the principles of the present invention as need to maximize communication and/or power consumption within RMM 110.

The radiation detector 230 within the preferred embodiments would be one that consists of an ionization chamber enabling the ionization chamber to be used to measure airborne alpha, beta, gamma and X-Ray intensities individually by varying a position of two absorption filters for a rejection of either alphas and/or betas.

The range for radiation measurements that are able to be measured by radiation detector 230 within the preferred embodiments would be from 0 to 500 R/hr. Measured energies by a preferred instrument include 3.5 MeV alpha, 0.02 MeV beta with a mylar window and 2.5 MeV alpha, 0.01 MeV beta with a nylon window. The sensitivity of such a preferred instrument for a lowest measurable level is 1 to 2 mR/hr using a Co 60 source and an efficiency of such a preferred instrument would allow it to read in R/hr and/or SI units as calibrated with Cobalt 60.

A volume of an ionization chamber for a radiation detector 230 used within the preferred embodiments comprises 440 cubic centimeters, with an active window area of 80 to 81 square centimeters. The radiation detector comprises a nylon window density of 0.5 mg/square centimeter, a Mylar window density of 0.85 mg/square centimeter, an alpha absorber density of 36 mg/square centimeter and a beta aluminum absorber density of 720 mg/square centimeter. The range of measurements for radiation detector 230 within the preferred embodiments is 0-50,000 mR/hr for gamma radiation, 0-32,000 M dpm using a nylon window.

To calibrate radiation detector 230 within the preferred embodiments, an entire ionization chamber is exposed to a uniform radiation field, with an instrument calibration control being adjusted until the radiation detector reads exactly as an exposed field, e.g., in a 500 R exposure field the instrument should read 500 R/hr.

The radiation detector 230 preferably comprises punctured window that enables contamination to enter an ionization chamber, requiring an ionization chamber assembly to be discarded. However, if a nylon window is ruptured, it can still function if absorbers are in place to prevent airborne radioactive particles from entering the ionization chamber.

The baseline battery selected for the RMM 110 is a thermal nucleonic battery with an operational lifetime of 25+ years. The battery can generate 50 to 100 mW of average power necessary to operate the RMM 110.

Each RMM 110 is a standalone unit and does not require preventative maintenance. With the wireless communications approach to passing data from the RMMs 110 to CMS 160 and a 25 to potentially 50 year battery life (with a redundant battery), each individual RMM 110 requires no external connectivity. The RMM 110 can be simply hung from a hook on a ceiling of a DRIFT 120 allowing simple robotic maintenance every 50 to 100 years by simple unhooking a non-functional RMM 110 and replacing it with a functional RMM 110 on the same hook. Alternately, a clothes-line type reel system can be used to simply reel a non-functional RMM 110 to an entrance of a DRIFT 120 for an operator to unhook the non-functional RMM 110 and replacing it with a functional RMM 110.

Figure 3:
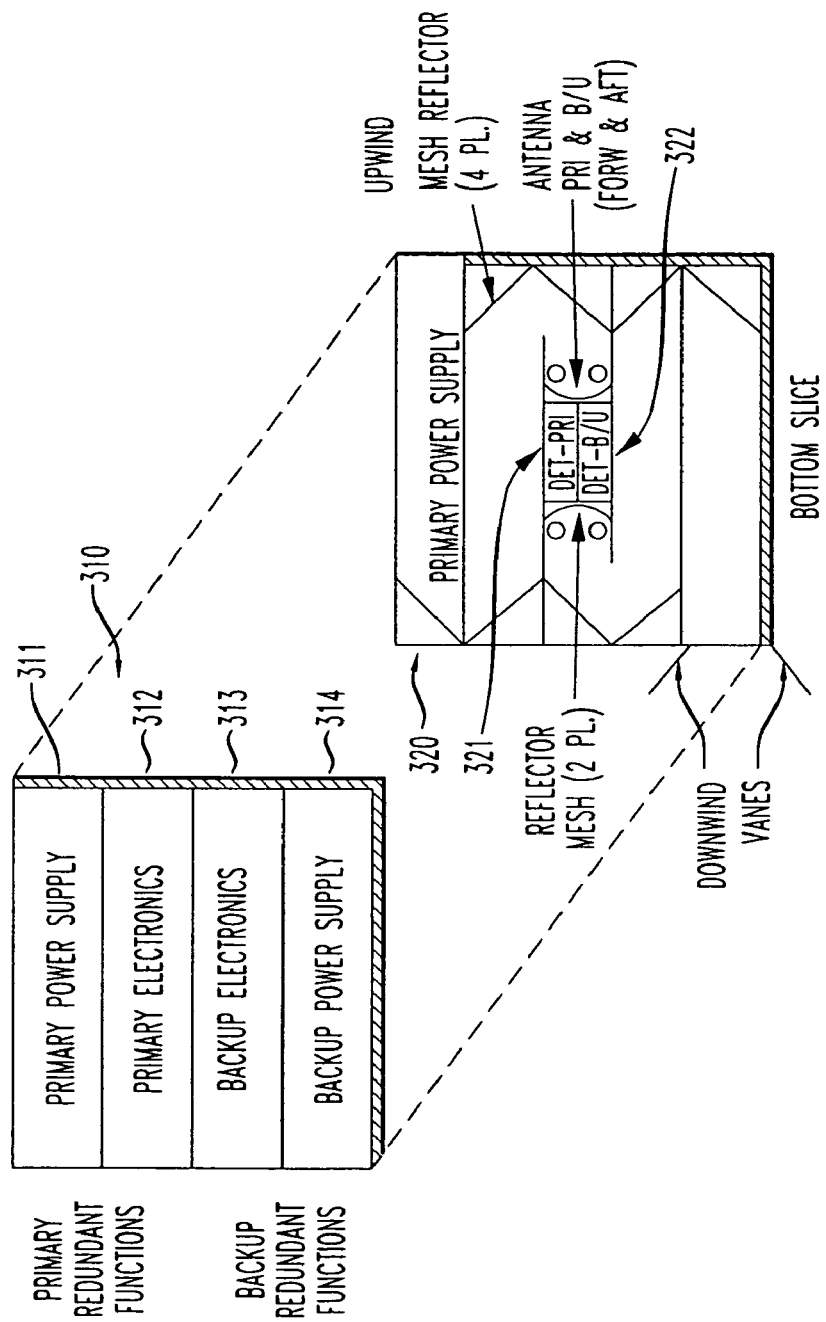
FIG. 3 shows a dual ported design for the Radiation Monitoring Module show in FIG. 2, in accordance with the principles of the present invention.

FIG. 3 shows a dual ported design for the RMM 110 show in FIG. 2. In particular the RMM 110 is divided into two sections, the electronics/power section (EPS) 310, and antenna/detector section (ADS) 320.

As discussed above, ADS 320 preferably includes redundancy for radiation detection. FIG. 3 shows ADS 320 to include a primary detector 321 and a backup detector 322.

In order to allow the TMS 100 to detect potential respirable radioactive particles, the ADS 320 is dual ported. ADS 320 allows airborne particles to traverse the redundant radiation detectors within the enclosure without being destroyed by a severe external environment. The ADS 320 contains redundant antennas that are placed in a waveguide with mesh reflectors to direct RF energy received external to the RMM 110. Mesh antennas provide good RF reflectivity, yet minimize the potential back scatter of radiation particles into a detector chamber. The mesh at the end of each waveguide provides for an air flow thru to the primary detectors and backup detectors. On the other side of the detectors, is an aft waveguide and antennas.

The electronics, RF and control circuitry within the RMM 110 are implemented in one (or possibly two) radiation hardened Application Specific Integrated Circuits (ASICs). The controller section of the RMM 110 preferably includes a MIPS processor core, a local RAM, a boot Programmable Read Only Memory (PROM) 270 for to allow program buddy loading from a next unit closer to the TM 130. This buddy loading eliminates the requirement to have substantial permanent program storage in the RMM 110, although alternately each RMM 110 can store and load its own program.

The RF ASIC portion of RMM 110 includes direct digital up and down conversion to an RF carrier frequency of 1.8 to 2.4 GHz wireless network standard frequencies. The direct digital conversion is preferably implemented on CMOS technology. The RF portion of RMM 110 includes specific commanding address such that specific low level setup commands, such as reset, self-test, redundancy switch, etc. can be sent to a specific unit without requiring a processor function to be operational. The RMM 110 supports data communications at 5 Mbps with an Eb/No margin of greater than 10 dB with Bi-Phase Shift Keying (BPSK) signaling with a transmit power of 0 dBm (1 mW) and an inter-unit spacing of 500 meters. With conventional encoding Forward Error Correction, the Eb/No margin increases by another 5 dB.

The RF port serpentine design shown in FIG. 3 for ADS 320 allows fore and aft communications while exposing shielded radiation detectors to the local air environment without requiring the detectors to meet the full GigaRad radiation environment requirements. Moreover, the serpentine RF port preferably includes vanes, as shown in FIG. 3, on a downwind port to create a slight vacuum to improve air draw across shielded radiation detectors 321 and 322.

Figure 4:
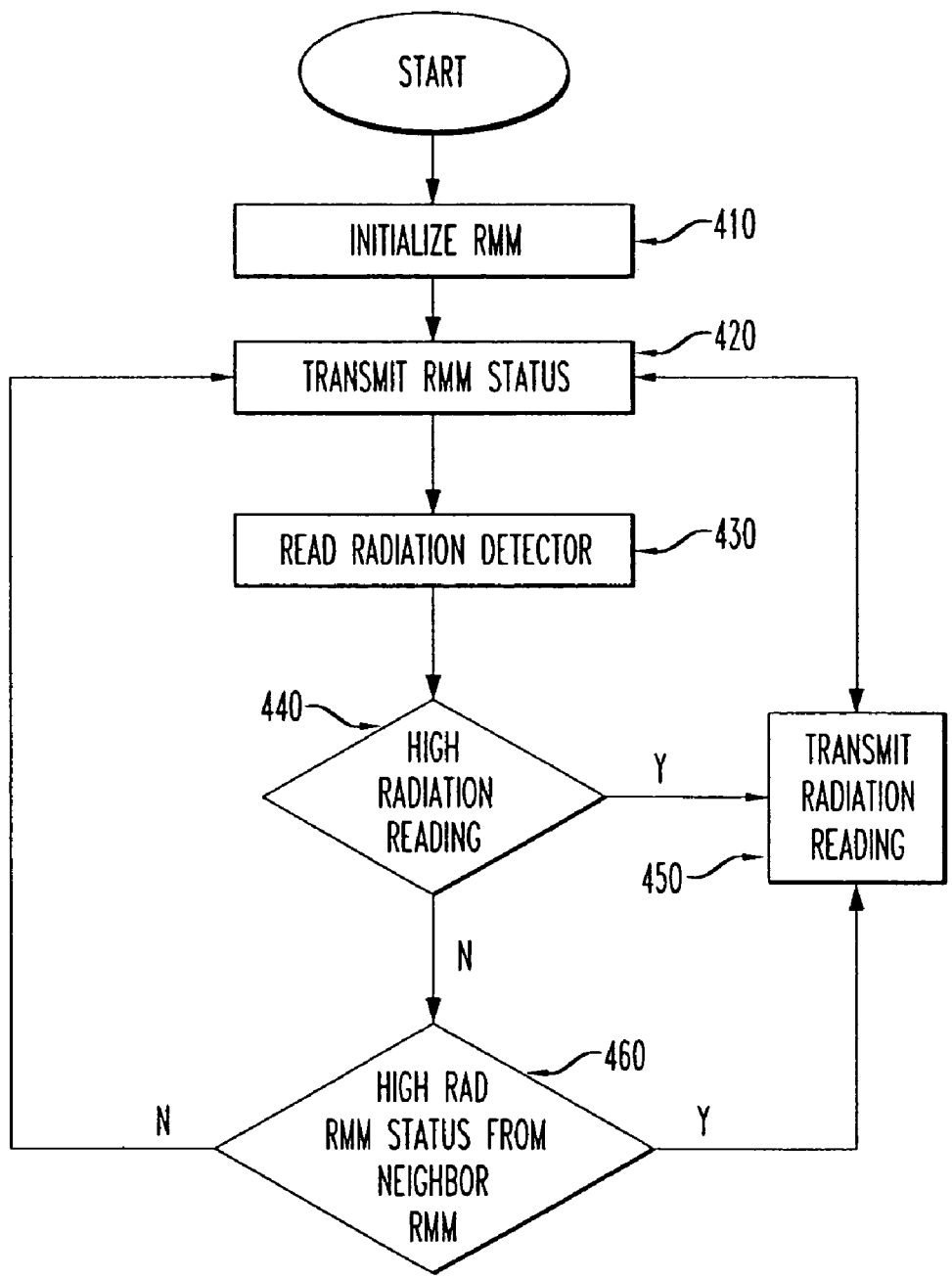
FIG. 4 shows a flow chart for a method of monitoring radiation with a tunnel monitoring system in accordance with the principles of the present invention as performed by a RMM, in accordance with the principles of the present invention.

FIG. 4 shows a flow chart for a method of monitoring radiation with the TMS 100 as performed by an RMM 110.

At step 410, the RMM 110 performs an initialization procedure. The initialization procedure 410 performs a self-test of the components within the RMM 110 to assure all components are operating properly. Moreover, step 410 performs a communication test to determine the ability of RMM 110 to communicate with other devices within the system, e.g., with other RMMs 110 and with TM 130.

At step 420, the RMM 110 transmits its status to the CMS 160. As part of initialization procedure of the overall TMS 100, each RMM 110 sends a status information packet to the CMS 160 to allow an operator to verify that each RMM 110 within the system is operating properly. Subsequent to the initialization procedure of the TMS 100, step 420 periodically transmits an RMM 110 status update to the CMS 160 to allow the CMS 160 to determine that the RMM 110 is operation, i.e., that the RMM 110 does not need servicing.

At step 430, RMM 110 takes a radiation reading from radiation detector 230. The radiation value from radiation detector 230 is preferably stored in non-volatile random access memory (RAM). In the event RMM 110 is unable to transmit the radiation value to CMS 160, historical radiation values can be retrieved from the RAM when RMM 110 is physically removed from its associated DRIFT 120 for servicing and/or replacement.

At step 440, a determination is made if the radiation value read in step 430 from radiation detector 230 is a high value. The radiation value read in step 430 is compared to a pre-stored radiation value stored in RMM 110 (loaded from the CMS 160). If the radiation value read in step 430 is higher that the pre-stored radiation value step 440 branches to step 450. Otherwise, if the radiation value read in step 430 is lower than the pre-stored radiation value step 440 branches to step 460.

At step 450, the radiation value that has been determined to be higher than the pre-stored radiation value is transmitted to the CMS 160. Moreover, step 450 takes a status/high radiation value that is received from a neighboring RMM 110 and relays the received status/high radiation value to CMS 160.

At step 460, a determination is made if a status/high radiation value is being received from a neighboring RMM 110. If a status/high radiation value has been received by RMM 110 from a neighboring RMM 110, step 460 branches to step 450. Otherwise, step 460 branches to step 420.

As can be seen from the flow chart of FIG. 4, step 420 is kept separate from step 450. In this manner, the only transmission from an RMM 110 is a periodic status update to allow CMS 160 to determine that the RMM 110 is operating properly, requiring a smaller transmission packet that minimizes power consumption, simply requiring a transmission of an address associated with an RMM 110 to announce that the RMM 110 is active. In the event that a high radiation value is read from radiation detector 230, an out of sequence transmission can be sent to CMS 160 to convey a high radiation condition within an associated DRIFT 120. RMM 110 can alternately wait and send a high radiation value from a neighboring RMM 110 with its transmission of a status update.

FIG. 4 shows a process performed by an RMM 110 that requires the RMM 110 to make processing decisions and conditionally transmit information based on the processing decisions. However, one of ordinary skill in the art would recognize that the processing decisions can be removed from the RMMs 110, with RMMs 110 simply relaying information from other RMMs 110 and transmitting its own status and radiation values to CMS 160. Without RMMs 110 making processing decisions, the circuitry within RMMs 110 can be simplified to reduce power consumption. Therefore, processing decision of a radiation status within a DRIFT 120 being acceptable or high would preferably be performed by CMS 160.

While the invention has been described with reference to the exemplary preferred embodiments thereof, those skilled in the art will be able to make various modifications to the described embodiments of the invention without departing from the true spirit and scope of the invention.

What is claimed is:

1. A radiation tunnel mounted radiation detection system, comprising:
    a radiation detector to detect radiation within a proximate vicinity of a first radiation monitoring module;
    a wireless transmitter to wirelessly communicate said detected radiation with a second radiation monitoring module; and
    a detachable mount to detachably mount said first radiation monitoring module and said second radiation monitoring module to a radiation storage facility tunnel leading to a radiation storage facility.

2. The radiation tunnel mounted radiation detection system according to claim 1, wherein:
    said detachable mount is a hook mechanism.

3. The radiation tunnel mounted radiation detection system according to claim 1, further comprising:
    a redundant battery system.

4. The radiation tunnel mounted radiation detection system according to claim 1, wherein:
    said wireless transmitter is a piconet transmitter.

5. The radiation tunnel mounted radiation detection system according to claim 1, wherein:
    said wireless transmitter is operable in a low power mode and a high power mode.

6. The radiation tunnel mounted radiation detection system according to claim 1, wherein:
    said second radiation monitoring module is able to communicate with a third radiation monitoring module further away from said first radiation monitoring module than said second radiation monitoring module.

7. The radiation tunnel mounted radiation detection system according to claim 1, wherein:
    said wireless transmitter is an infrared transmitter.

8. The radiation tunnel mounted radiation detection system according to claim 1, wherein:
    said wireless transmitter is adapted to communicate with a scatternet.

9. A tunnel mounted radiation detection system comprised of a first radiation monitoring module and a second radiation monitoring module, comprising:
    a radiation detector to detect radiation within a proximate vicinity of said first radiation monitoring module;
    a wireless transmitter to wirelessly communicate said detected radiation with said second radiation monitoring module; and
    a detachable mount to detachably mount said first radiation monitoring module and said second radiation monitoring module to said tunnel;
    wherein said radiation detector is comprised of an indirect RF port to allow fore and aft communications while exposing shielded radiation detectors to said proximate vicinity.

10. The tunnel mounted radiation detection system according to claim 9, wherein:
    said indirect RF port is a serpentine RF port.

11. The tunnel mounted radiation detection system according to claim 9, wherein:
    said indirect RF port is comprised of vanes on a downwind port to create a slight vacuum to facilitate an air draw across shielded radiation detectors.

12. The radiation tunnel mounted radiation detection system according to claim 1, wherein:
    said detachable mount mounts said first radiation monitoring module and said second radiation monitoring module to a ceiling of radiation storage facility tunnel.

13. A method of monitoring radiation within a radiation tunnel, comprising:
    detachably mounting, with a detachable mount, a first radiation monitoring module and a second radiation monitoring module to a radiation storage facility tunnel leading to a radiation storage facility;
    determining radiation information within a proximate vicinity of said first radiation monitoring module;
    establishing a wireless communication link between said first radiation monitoring module and said second radiation monitoring module; and
    communicating said radiation information with said second radiation monitoring module over said wireless communication link.

14. The method of monitoring radiation within a radiation tunnel according to claim 13, wherein:
    said detachable mount is a hook mechanism.

15. The method of monitoring radiation within a radiation tunnel according to claim 13, further comprising:
    periodically transmitting status information related to said first radiation monitoring module to said second radiation monitoring module.

16. The method of monitoring radiation within a radiation tunnel according to claim 13, further comprising:
    receiving at said first radiation monitoring module at least one of a status information and a radiation information from at least one of said second radiation monitoring module and a third radiation monitoring module; and
    communicating said radiation information from said first radiation monitoring module to a central monitoring subsystem.

17. The method of monitoring radiation within a radiation tunnel according to claim 13, wherein:
said wireless communication link is a piconet communication link.

18. The method of monitoring radiation within a radiation tunnel according to claim 13, wherein:
said wireless communication link is an infrared communication link.

19. The method of monitoring radiation within a radiation tunnel according to claim 13, wherein:
said detachable mount mounts said first radiation monitoring module and said second radiation monitoring module to a ceiling of radiation storage facility tunnel.

20. A method of monitoring radiation within a tunnel, comprising:
detachably mounting a first radiation monitoring module and a second radiation monitoring module to said tunnel with a detachable mount;
determining radiation information within a proximate vicinity of said first radiation monitoring module;
establishing a wireless communication link between said first radiation monitoring module and said second radiation monitoring module; and
communicating said radiation information with said second radiation monitoring module over said wireless communication link;
wherein said first radiation monitoring module and said second radiation monitoring module comprise an indirect RF port to allow fore and aft communications while exposing shielded radiation detectors to said proximate vicinity.

21. The method of monitoring radiation within a tunnel according to claim 20, wherein:
said indirect RF port is a serpentine RF port.

22. The method of monitoring radiation within a tunnel according to claim 20, wherein:
said indirect RF port is comprised of vanes on a downwind port to create a slight vacuum to facilitate an air draw across shielded radiation detectors.

23. Apparatus for monitoring radiation within a radiation tunnel, comprising:
means for detachably mounting, with a detachable mount, a first radiation monitoring module and a second radiation monitoring module to a radiation storage facility tunnel leading to a radiation storage facility;
means for determining radiation information within a proximate vicinity of said first radiation monitoring module;
means for establishing a wireless communication link between said first radiation monitoring module and said second radiation monitoring module; and
means for communicating said radiation information with said second radiation monitoring module over said wireless communication link.

24. The apparatus for monitoring radiation within a radiation tunnel according to claim 23, wherein:
said detachable mount is a hook mechanism.

25. The apparatus for monitoring radiation within a radiation tunnel according to claim 23, further comprising:
means for periodically transmitting status information related to said first radiation monitoring module to said second radiation monitoring module.

26. The apparatus for monitoring radiation within a radiation tunnel according to claim 23, further comprising:
means for receiving at said first radiation monitoring module at least one of a status information and a radiation information from at least one of said second radiation monitoring module and a third radiation monitoring module; and
means for communicating said radiation information from said first radiation monitoring module to a central monitoring subsystem.

27. The apparatus for monitoring radiation within a radiation tunnel according to claim 23, wherein:
said wireless communication link is a piconet communication link.

28. The apparatus for monitoring radiation within a radiation tunnel according to claim 23, wherein:
said wireless communication link is an infrared communication link.

29. The apparatus for monitoring radiation within a radiation tunnel according to claim 23, wherein:
said detachable mount mounts said first radiation monitoring module and said second radiation monitoring module to a ceiling of radiation storage facility tunnel.

30. Apparatus for monitoring radiation within a tunnel, comprising:
means for detachably mounting a first radiation monitoring module and a second radiation monitoring module to said tunnel with a detachable mount;
means for determining radiation information within a proximate vicinity of said first radiation monitoring module;
means for establishing a wireless communication link between said first radiation monitoring module and said second radiation monitoring module; and
means for communicating said radiation information with said second radiation monitoring module over said wireless communication link;
wherein said first radiation monitoring module and said second radiation monitoring module comprise an indirect RF port to allow fore and aft communications while exposing shielded radiation detectors to said proximate vicinity.

31. The apparatus for monitoring radiation within a tunnel according to claim 30, wherein:
said indirect RF port is a serpentine RF port.

32. The apparatus for monitoring radiation within a tunnel according to claim 30, wherein:
said indirect RF port is comprised of vanes on a downwind port to create a slight vacuum to facilitate an air draw across shielded radiation detectors.

* * * * *